(12) United States Patent
Cai et al.

(10) Patent No.: US 9,712,352 B2
(45) Date of Patent: Jul. 18, 2017

(54) HIGH-SPEED MULTI-CHANNEL DATA TRANSMISSION METHOD, RELATED DEVICES AND SYSTEM

(71) Applicant: ZTE Corporation, Shenzhen, Guangdong (CN)

(72) Inventors: Chao Cai, Shenzhen (CN); Tao Feng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 109 days.

(21) Appl. No.: 14/442,472

(22) PCT Filed: Aug. 22, 2013

(86) PCT No.: PCT/CN2013/082106
§ 371 (c)(1),
(2) Date: Jun. 11, 2015

(87) PCT Pub. No.: WO2014/075481
PCT Pub. Date: May 22, 2014

(65) Prior Publication Data
US 2015/0358185 A1    Dec. 10, 2015

(30) Foreign Application Priority Data

Nov. 16, 2012 (CN) .......................... 2012 1 0463978

(51) Int. Cl.
*H04L 25/14* (2006.01)
*H04L 5/00* (2006.01)
*H04L 7/00* (2006.01)

(52) U.S. Cl.
CPC ............... *H04L 25/14* (2013.01); *H04L 5/00* (2013.01); *H04L 7/0016* (2013.01)

(58) Field of Classification Search
None
See application file for complete search history.

(56) References Cited

U.S. PATENT DOCUMENTS 8,073,090 B2    12/2011  Zhang
2003/0043434 A1*  3/2003  Brachmann ............. H04L 25/14
                                                    398/154

(Continued)

FOREIGN PATENT DOCUMENTS

CN    101631064 A    1/2010
CN    101873186 A   10/2010

(Continued)

OTHER PUBLICATIONS

International Search Report in international application No. PCT/CN2013/082106, mailed on Dec. 5, 2013.

(Continued)

*Primary Examiner* — Bunjob Jaroenchonwanit
(74) *Attorney, Agent, or Firm* — Oppedahl Patent Law Firm LLC

(57) ABSTRACT

A high-speed multi-channel data transmission method is disclosed. The method includes that: a data sender replaces data at intervals of N periods with frame headers in data channels, sequentially stores the data replaced with the frame headers in the data channels in a Deskew channel, and sends the data in the data channels and data in the Deskew channel to a data receiver; the data receiver determines frame header locations of the data channels and the Deskew channel, calculates offsets of the data channels according to the frame header locations, and performs period compensation for the data channels according to the calculated offsets to keep the frame header of each data channel and the frame header of the Deskew channel in a relative relationship the same as that at the data sender; and the frame headers on the data channels and the corresponding data on the Deskew channel are replaced to finish data restoration. A high-speed multi-channel data transmission system and related devices are further disclosed. According to the embodiments of the disclosure, 400 Gb/s multi-channel data alignment and res- (Continued)

toration can be realized, and speed of data alignment and restoration is increased.

23 Claims, 6 Drawing Sheets

(56) References Cited

U.S. PATENT DOCUMENTS

| | | | | |
|---|---|---|---|---|
| 2003/0131301 | A1* | 7/2003 | Shimono | H04L 25/14 714/752 |
| 2007/0006053 | A1* | 1/2007 | Otto | H04L 25/14 714/700 |
| 2007/0088991 | A1* | 4/2007 | Shin | H04L 1/242 714/700 |
| 2008/0131136 | A1* | 6/2008 | Shin | H04L 25/14 398/135 |
| 2008/0222594 | A1* | 9/2008 | Maniloff | H03K 19/1731 716/128 |
| 2010/0008460 | A1* | 1/2010 | Zhang | H04L 25/14 375/376 |
| 2010/0262893 | A1 | 10/2010 | Carter | |
| 2015/0061906 | A1* | 3/2015 | Luu | H03M 1/1205 341/122 |

FOREIGN PATENT DOCUMENTS

| | | |
|---|---|---|
| CN | 102204198 A | 9/2011 |
| CN | 102970109 A | 3/2013 |

OTHER PUBLICATIONS

English Translation of the Written Opinion of the International Search Authority in international application No. PCT/CN2013/082106, mailed on Dec. 5, 2013.

Supplementary European Search Report in European application No. 13855120.5, mailed on Oct. 19, 2015.

\* cited by examiner

HIGH-SPEED MULTI-CHANNEL DATA TRANSMISSION METHOD, RELATED DEVICES AND SYSTEM

TECHNICAL FIELD

The disclosure relates to the field of data transmission, and in particular to a high-speed multi-channel data transmission method, related devices and system.

BACKGROUND

Along with increase of requirements of users on network bandwidths, requirements on equipment interface rates also increase, from 10 Gb/s to 40 Gb/s and then to 100 Gb/s, 400 Gb/s and even 1 Tb/s. For a service at a level of higher than 100 Gb/s, transmission of the whole service cannot be finished by only one physical channel, and at present, such a problem is solved mainly by adopting a multi-channel method.

A principle for multi-channel transmission is to evenly distribute the whole high-bandwidth data to n (n>1) independent physical channels at a data sender and then restore the data of the n independent physical channels into the complete data sent by the data sender through a certain restoration mechanism at a data receiver. Multi-channel data transmission solves the problem of limitation to a single-port rate of a conventional chip and makes higher-bandwidth data transmission possible.

100 Gb/s, 40 Gb/s and 100 Gb/s multi-channel data alignment and restoration standards have been sequentially proposed. However, a conventional higher-than-40 Gb/s multi-channel data alignment and restoration standard is only applied to a physical channel with an interface rate of lower than 12 G/bs, and 400 Gb/s multi-channel data may adopt a single-path rate of 28 Gb/s, which has yet not been implemented at present. Further, the conventional higher-than-40 Gb/s multi-channel data alignment and restoration standard replaces data with a bit data stream at the sender and adopts the replacing bit data stream for data alignment and restoration at the receiver, the implementation of such a method is a tedious process, and when there is great data offset between channels, finishing searching all of the data is a great challenge for controlling a chip resource time sequence, restoration of the data is relatively slow, and chip implementation cost is excessively high.

SUMMARY

In view of this, embodiments of the disclosure provide a high-speed multi-channel data transmission method, related devices and a system, which can realize 400 Gb/s multi-channel data alignment and restoration and increase speed of data alignment and restoration.

The technical solutions of the embodiments of the disclosure are implemented as follows.

An embodiment of the disclosure provides a high-speed multi-channel data transmission method, the method includes that:

a data sender replaces data that are at intervals of N periods with frame headers in data channels, sequentially stores the data replaced with the frame headers in the data channels in a Deskew channel, and sends data in the data channels and data in the Deskew channel to a data receiver.

Preferably, the data sender replaces the data at the intervals of N periods with the frame headers in the data channels in such manners that:

frame headers of every two adjacent data channels have an offset of one period, and a frame header of a next data channel is one period slower than a frame header of a previous data channel; and a frame header of the 0th data channel is one period slower than a frame header of the Deskew channel.

Preferably, each of the frame headers includes a high-order part and a low-order part, and the high-order parts of the frame headers are identical and the low-order parts of the frame headers are different from each other.

Preferably, a numerical value of Bit Interleaved Parity 3 (BIP3) of the high-order part of each frame header is an amount of data starting from a previous frame header to a current frame header, excluding the current frame header.

An embodiment of the disclosure further provides a high-speed multi-channel data receiving method, the method includes that:

a data receiver determines locations of frame headers in data channels and a location of a frame header in a Deskew channel after receiving data from a data sender, calculates offsets of the data channels according to locations of frame headers, and performs period compensation on the data channels according to the calculated offsets, so as to keep a frame header of each data channel and the frame header of the Deskew channel in a relative relationship the same as that at the data sender; and the frame headers in the data channels are replaced with the corresponding data in the Deskew channel to finish data restoration.

Preferably, the data sent by the data sender comprises data in the data channels and data in the Deskew channel.

The data at intervals of N periods is replaced with the frame headers on the data channels, and the data replaced with the frame headers is sequentially stored in the Deskew channel.

The data in the Deskew channel is the data replaced with the frame headers in the data channels.

Preferably, the data at the intervals of N periods is replaced with the frame headers in such manners that:

the frame headers of every two adjacent data channels have an offset of one period, and a frame header of a next data channel is one period slower than a frame header of a previous data channel; and a frame header of the 0th data channel is one period slower than the frame header of the Deskew channel.

Preferably, each of the frame headers includes a high-order part and a low-order part, and the high-order parts of the frame headers are identical and the low-order parts of the frame headers are different from each other.

Preferably, the step that the data receiver determines the locations of frame headers in the data channels and the Deskew channel is implemented as follows:

fields of each channel are searched for according to high-order part sequences of the frame headers, and if fields matching with the high-order part sequences of the frame headers are found, the fields are determined as the frame headers of the channels with the fields.

Preferably, a numerical value of BIP3 of the high-order parts of each frame header is an amount of data starting from a previous frame header to a current frame header, excluding the current frame header.

An embodiment of the disclosure further provides a high-speed multi-channel data sender. The data sender includes a frame header replacement unit and a data sending unit.

The frame header replacement unit is configured to replace data at intervals of N periods in data channels with frame headers, and to sequentially store in a Deskew channel the data replaced with the frame headers in the data channels; and the data sending unit is configured to send the data in the data channels and the Deskew channel to a data receiver.

Preferably, the data at the intervals of N periods is replaced with the frame headers in the data channels in such manners that:

the frame headers of every two adjacent data channels have an offset of one period, and a frame header of a next data channel is one period slower than a frame header of a previous data channel; and a frame header of the 0th data channel is one period slower than a frame header of the Deskew channel.

Preferably, each of the frame headers includes a high-order part and a low-order part, and the high-order parts of the frame headers are identical and the low-order parts of the frame headers are different from each other.

Preferably, a numerical value of BIP3 of the high-order part of each frame header is the amount of data starting from a previous frame header to a current frame header, excluding the current frame header.

An embodiment of the disclosure further provides a high-speed multi-channel data receiver. The data receiver includes a frame determination unit, a data alignment unit and a data restoration unit.

The frame determination unit is configured to determine locations of frame headers in data channels and a location of a frame header in a Deskew channel after data are received.

The data alignment unit is configured to calculate offsets of the data channels according to locations of frame headers determined by the frame determination unit, and perform period compensation on the data channels according to the calculated offsets, so as to keep a frame header of each data channel and the frame header of the Deskew channel in a relative relationship the same as that at a data sender.

The data restoration unit is configured to replace the frame headers in the data channels with the corresponding data in the Deskew channel to finish data restoration.

Preferably, each of the frame headers includes a high-order part and a low-order part, and the high-order parts of the frame headers are identical and the low-order parts of the frame headers are different from each other.

Preferably, the frame determination unit determines the frame header locations in the data channels and the Deskew channel in such a manner that: the frame determination unit searches for fields of each channel according to high-order part sequences of the frame headers of the received data, and if fields matching with the high-order part sequences of the frame headers are found, the fields are determined as the frame headers of the channels with the fields.

Preferably, a numerical value of BIP3 of the high-order part of each frame header is an amount of data starting from a previous frame header to a current frame header, excluding the current frame header.

An embodiment of the disclosure further provides a high-speed multi-channel data transmission system. The system includes any abovementioned high-speed multi-channel data sender and any abovementioned high-speed multi-channel data receiver.

According to the high-speed multi-channel data transmission method, related devices and system provided by the embodiments of the disclosure, problems about conventional 400 Gb/s multi-channel data alignment and restoration are solved. The data is periodically replaced with the frame headers at the data sender, and all the frame headers have the same high-order part, so that the frame header locations can be rapidly found at the data receiver, speed of data restoration and alignment is increased, and complexity in the data alignment and restoration of the data receiver when the data is replaced with a bit data stream according to prior art is lowered.

Furthermore, BIP3 value and BIP7 value of the high-order part in frame header sequences are the amount of the data from the previous frame header to the current frame header, excluding the current frame header, and the BIP3 and BIP7 values are respectively calculated at the data sender and the data receiver, and are compared, so that a bit error condition after data transmission can be determined, which supplements a bit error detection mechanism of a single channel.

BRIEF DESCRIPTION OF THE DRAWINGS

FIG. 4 is a diagram illustrating offsets between data channels and a Deskew channel at a data receiver according to an embodiment of the disclosure;

FIG. 5 is a diagram illustrating frame header alignment between data channels and a Deskew channel at a data receiver according to an embodiment of the disclosure;

FIG. 6 is a diagram illustrating restored data channels at a data receiver according to an embodiment of the disclosure;

DETAILED DESCRIPTION

Embodiments of the disclosure provide a method, related devices and system for data transmission based on multiple channels at a maximum rate of 400 Gb/s.

The disclosure is further described with reference to the drawings and specific embodiments in detail.

Figure 1:
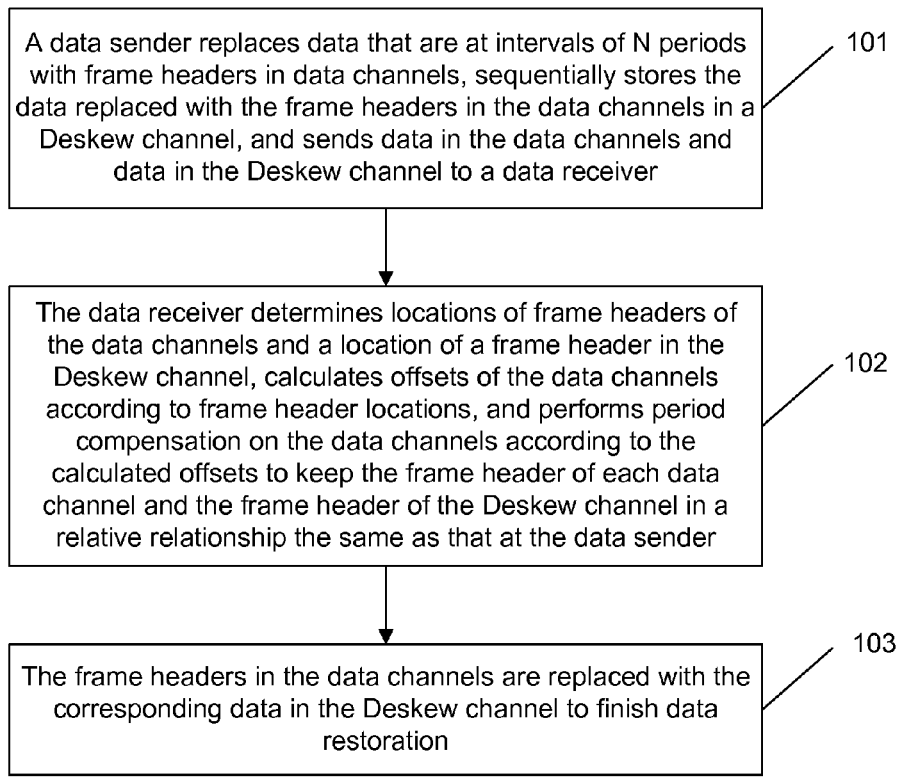
FIG. 1 is a flowchart of a high-speed multi-channel data transmission method according to an embodiment of the disclosure.

FIG. 1 is a flowchart of a high-speed multi-channel data transmission method according to an embodiment of the disclosure. As shown in FIG. 1, the method includes the following steps.

In Step 101, a data sender replaces data that are at intervals of N periods with frame headers in data channels, sequentially stores the data replaced with the frame headers in the data channels in a Deskew channel, and sends the data in the data channels and the data in the Deskew channel to a data receiver.

Data sender replaces the data that at the intervals of N periods with the frame headers in the data channels in such manners that:

There is an offset of one period between the frame headers of every two adjacent data channels, and a frame header of a next data channel is one period slower than a frame header of a previous data channel; and a frame header of the 0th data channel is one period slower than a frame header of the Deskew channel.

The N periods may be obtained by dividing the total data amount of each frame by the amount of data transmitted in each clock period and then multiplying the number of logic channels. In an embodiment of the disclosure, a 400 Gb/s data transmission service is taken as an example, a value of N is 1,632.

The data channels are configured to transmit the sent data. The Deskew channel is configured to transmit the original data, which is replaced with the frame headers, in the data channels.

Specifically, when the data sender processes data of 400 Gb/s in a chip, multiple data channels are usually adopted for processing. In case of a maximum rate of 28 Gb/s for a single port, the number of required ports is 16.

During actual running, a clock domain for a high-speed serdes interface to receive data is a high-frequency clock domain, but the chip is actually in a relatively low clock domain due to own processing rate problem. Therefore, it is necessary to lower working frequency and increase a data width, so as to lower a requirement on maximum frequency of the chip. Therefore, 16 data channels of 28 Gb/s may further be slowed in the chip, each 28 Gb/s data channel is divided into two data channels according to high order and low order, with a maximum rate of each data channel being 14 Gb/s. By such processing, it can be viewed as that there are 32 data channels with the maximum rate of 14 Gb/s for bearing the 400 Gb/s service in the chip.

Figure 2:
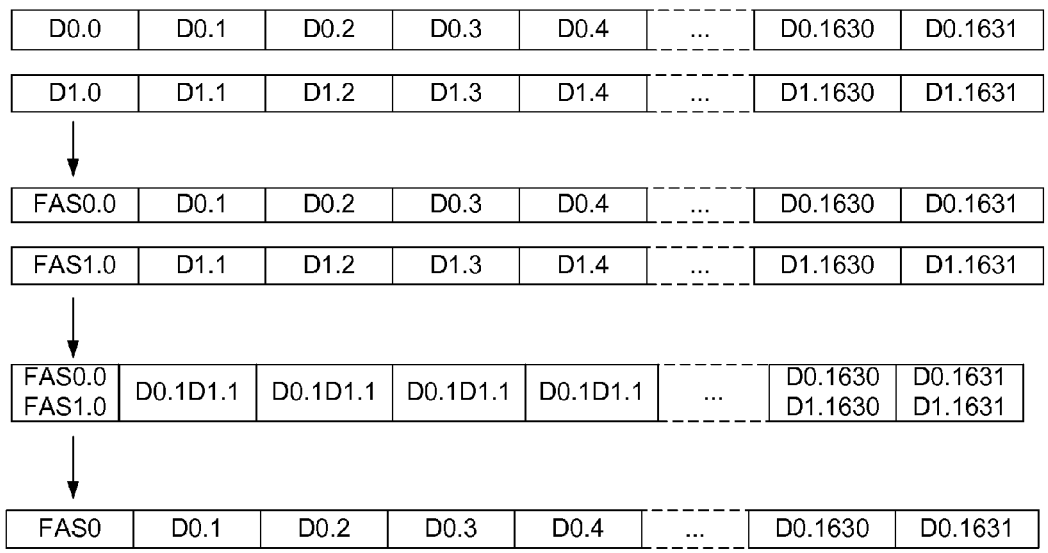
FIG. 2 is a diagram illustrating combining two adjacent data channels into one data channel according to an embodiment of the disclosure.

Therefore, at the data sender, every two adjacent data channels are required to be combined into one data channel for the data sent from the interior of the chip. The data of even data channels is placed at high-order parts, and the data of odd data channels is placed at low-order parts. FIG. 2 is a diagram illustrating combining two adjacent data channels into one data channel according to an embodiment of the disclosure. As shown in FIG. 2, data channel 0 and data channel 1 are taken as an example. Data at intervals of 1,632 periods is replaced with a frame header in data channel 0, data at intervals of 1,632 periods is correspondingly replaced with a frame header in data channel 1. The period for such replacement in data channel 1 is synchronized with that in data channel 0. Starting from the frame headers of data channel 0 and data channel 1, the data width is changed from k bits to 2 k bits. Frame header FAS0.0 of data channel 0 is placed at the high-order part of the 2 k bits and frame header FAS1.0 of data channel 1 is placed at the low-order part, so that the combined frame header is FAS0.0FAS1.0. That is, combined FAS0.0FAS1.0 is frame header FAS0of the 0th data channel of the 16 data channels. Correspondingly, data D0.0 of data channel 0 is placed at the high-order part of the 2 k bits and data D1.0 of data channel 1 is placed at the low-order part of the 2 k bits, so that the combined data is D0.0D1.0. That is, combined D0.0D1.0 is data D0.0, which is replaced with the frame headers, of the 0th data channel of the 16 data channels.

In the case of 32 data channels, encoding of the frame headers is shown in below Table 1. Format of the frame headers is {M0 M1 M2 BIP3 M4 M5 M6 BIP7}. BIP3 is the amount of all the data from a previous frame header to a current frame header, excluding the current frame header. BIP7 flips the bit value of BIP3.

From below Table 1, it can be seen that the frame headers of all the even data channels adopt the same coding scheme and the frame headers of all the odd data channels adopt different coding schemes. This is because that when every two adjacent data channels are combined into one data channel, the frame headers of the even data channels may be placed at the high-order part and the frame headers of the odd data channels may be placed at the low-order part, the high-order parts used for the frame determination and alignment operation of the data receiver are required to keep consistent, and the low-order parts used to identify channel numbers of the data channels at the data receiver are required to be different from each other.

TABLE 1

| Channel number | FASn = (M0 M1 M2 BIP3 M4 M5 M6 BIP7) (n = 0-31) |
|---|---|
| 0 | 0xC1, 0x68, 0x21, BIP3, 0x3E, 0x97, 0xDE, BIP7 |
| 1 | 0x9D, 0x71, 0x8E, BIP3, 0x62, 0x8E, 0x71, BIP7 |
| 2 | 0xC1, 0x68, 0x21, BIP3, 0x3E, 0x97, 0xDE, BIP7 |
| 3 | 0x59, 0x4B, 0xE8, BIP3, 0xA6, 0xB4, 0x17, BIP7 |
| 4 | 0xC1, 0x68, 0x21, BIP3, 0x3E, 0x97, 0xDE, BIP7 |
| 5 | 0x4D, 0x95, 0x7B, BIP3, 0xB2, 0x6A, 0x84, BIP7 |
| 6 | 0xC1, 0x68, 0x21, BIP3, 0x3E, 0x97, 0xDE, BIP7 |
| 7 | 0xF5, 0x07, 0x09, BIP3, 0x0A, 0xF8, 0xF6, BIP7 |
| 8 | 0xC1, 0x68, 0x21, BIP3, 0x3E, 0x97, 0xDE, BIP7 |
| 9 | 0xDD, 0x14, 0xC2 , BIP3, 0x22, 0xEB, 0x3D, BIP7 |
| 10 | 0xC1, 0x68, 0x21, BIP3, 0x3E, 0x97, 0xDE, BIP7 |
| 11 | 0x9A, 0x4A, 0x26, BIP3, 0x65, 0xB5, 0xD9, BIP7 |
| 12 | 0xC1, 0x68, 0x21, BIP3, 0x3E, 0x97, 0xDE, BIP7 |
| 13 | 0x7B, 0x45, 0x66, BIP3, 0x84, 0xBA, 0x99, BIP7 |
| 14 | 0xC1, 0x68, 0x21, BIP3, 0x3E, 0x97, 0xDE, BIP7 |
| 15 | 0xA0, 0x24, 0x76, BIP3, 0x5F, 0xDB, 0x89, BIP7 |
| 16 | 0xC1, 0x68, 0x21, BIP3, 0x3E, 0x97, 0xDE, BIP7 |
| 17 | 0x68, 0xC9, 0xFB, BIP3, 0x97, 0x36, 0x04, BIP7 |
| 18 | 0xC1, 0x68, 0x21, BIP3, 0x3E, 0x97, 0xDE, BIP7 |
| 19 | 0xFD, 0x6C, 0x99, BIP3, 0x02, 0x93, 0x66, BIP7 |
| 20 | 0xC1, 0x68, 0x21, BIP3, 0x3E, 0x97, 0xDE, BIP7 |
| 21 | 0xB9, 0x91, 0x55, BIP3, 0x46, 0x6E, 0xAA, BIP7 |
| 22 | 0xC1, 0x68, 0x21, BIP3, 0x3E, 0x97, 0xDE, BIP7 |
| 23 | 0x5C, 0xB9, 0xB2, BIP3, 0xA3, 0x46, 0x4D, BIP7 |
| 24 | 0xC1, 0x68, 0x21, BIP3, 0x3E, 0x97, 0xDE, BIP7 |
| 25 | 0x1A, 0xF8, 0xBD, BIP3, 0xE5, 0x07, 0x42, BIP7 |
| 26 | 0xC1, 0x68, 0x21, BIP3, 0x3E, 0x97, 0xDE, BIP7 |
| 27 | 0x83, 0xC7, 0xCA, BIP3, 0x7C, 0x38, 0x35, BIP7 |
| 28 | 0xC1, 0x68, 0x21, BIP3, 0x3E, 0x97, 0xDE, BIP7 |
| 29 | 0x35, 0x36, 0xCD, BIP3, 0xCA, 0xC9, 0x32, BIP7 |
| 30 | 0xC1, 0x68, 0x21, BIP3, 0x3E, 0x97, 0xDE, BIP7 |
| 31 | 0xC4, 0x31, 0x4C, BIP3, 0x3B, 0xCE, 0xB3, BIP7 |

Figure 3:
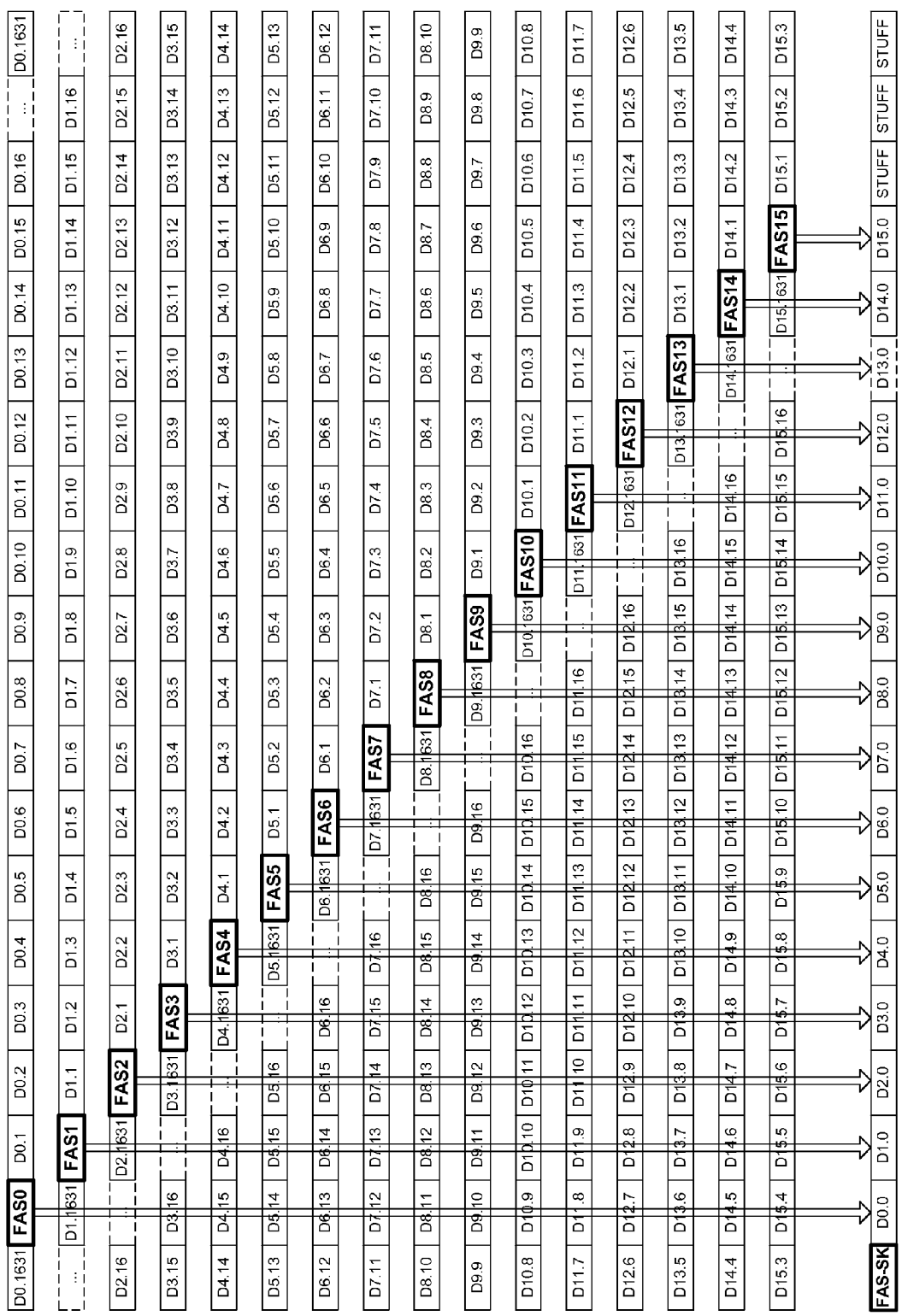
FIG. 3 is a diagram illustrating frame header relationships among channels and frame header replacement according to an embodiment of the disclosure.

The data sender replaces the data that at the intervals of 1,632 periods with the frame headers in the 16 data channels. The replaced data is sequentially stored in the Deskew channel. FIG. 3 is a diagram illustrating frame header relationships among channels and frame header replacement according to an embodiment of the disclosure. As shown in FIG. 3, in the 16 data channels, the frame headers of every two adjacent data channels have an offset of one period, and a frame header of a next data channels is one period slower than a frame header of a previous data channels. The frame header of the 0th data channel is one period slower than the frame header of the Deskew channel.

The step that the data replaced with the frame headers in the data channels is sequentially stored in the Deskew channel is implemented as follows: data D0.0 replaced with frame header FAS0 in the 0th data channel is stored in a first period after frame header FAS-SK in the Deskew channel, data D1.0 replaced with frame header FAS1 in the first channel is stored in a second period after frame header FAS-SK in the Deskew channel, and the rest can be done in the same manner until data D15.0 replaced with frame header FAS15 in the 15th channel is stored in a 16th period after frame header FAS-SK in the Deskew channel. Padding data can be stored in 17th to 1018th periods after frame header FAS-SK in the Deskew channel.

In Step 102, the data receiver determines locations of frame headers in the data channels and a location of frame header in the Deskew channel, calculates offsets of the data channels according to the frame header locations, and performs period compensation for the data channels according to the calculated offsets to keep the frame header of each data channel and the frame header of the Deskew channel in a relative relationship the same as that at the data sender.

After the data is transmitted, bit locations of the data in each data channel may vary after deserialization, and time points of arrival of the data in each data channel may be different, so there exist bit offsets between the data of the data channels. Therefore, it is necessary to calculate the offset of every data channel and perform period compensation for the offsets, so as to keep the frame header of each data channel and the frame header of the Deskew channel in a fixed relative relationship.

Firstly, it is necessary to determine the locations of frame headers in the data channels and the location of frame header in the Deskew channel. The data receiver determines the frame header locations in the data channels and the Deskew channel by a method including that:

fields of each channel are searched according to high-order part sequences of the frame headers, and if fields matching with the high-order part sequences of the frame headers are found, the fields are determined as the frame headers of the channels with the fields.

Specifically, since the 16 data channels with the maximum rate of 28 Gb/s in the embodiment of the disclosure are formed by combining 32 data channels with the maximum rate of 14 Gb/s, both the frame header and the data consist of two parts, including a high-order part and a low-order part. The high-order parts of the frame headers are the frame headers of the even data channels in the 32 data channels, and the low-order parts are the frame headers of the odd data channels in the 32 data channels. The frame headers of all the even channels adopt the same coding scheme, and all the odd channels adopt different coding schemes, so that the high-order parts of the frame headers of all of the 16 data channels are the same. As shown in above Table 1, the coding format of the frame headers of all the even channels is {0xC1 0x68 0x21 BIP3 0x3E 0x97 0xDE BIP7}, the fields of each channel are searched according to the frame header sequences except BIP3 and BIP7, and if the fields matching with the frame header sequences are found, the frame headers of the corresponding channels are found.

Secondly, the offsets of the data channels are calculated according to the determined frame header locations of the data channels and the Deskew channel. A method for calculating the offsets of the frame header locations includes that:

locations of frame headers of the data channels are respectively compared with the location of the frame header of the Deskew channel to obtain period offsets between the data channels and the Deskew channel; and fixed offsets of the frame header locations of the data sender and the frame header location of the Deskew channel are subtracted from the period offsets to obtain the offsets of the frame header locations.

Thirdly, period compensation is performed on the data channels according to the calculated offsets, which includes that:

if the calculated offsets of the frame header locations are 0, it is indicated that there are no offsets of the frame header locations and no compensation is required; and if the calculated offsets of the frame header locations are not 0, it is indicated that the frame header locations are advanced or delayed and period compensation is required.

Figure 4:
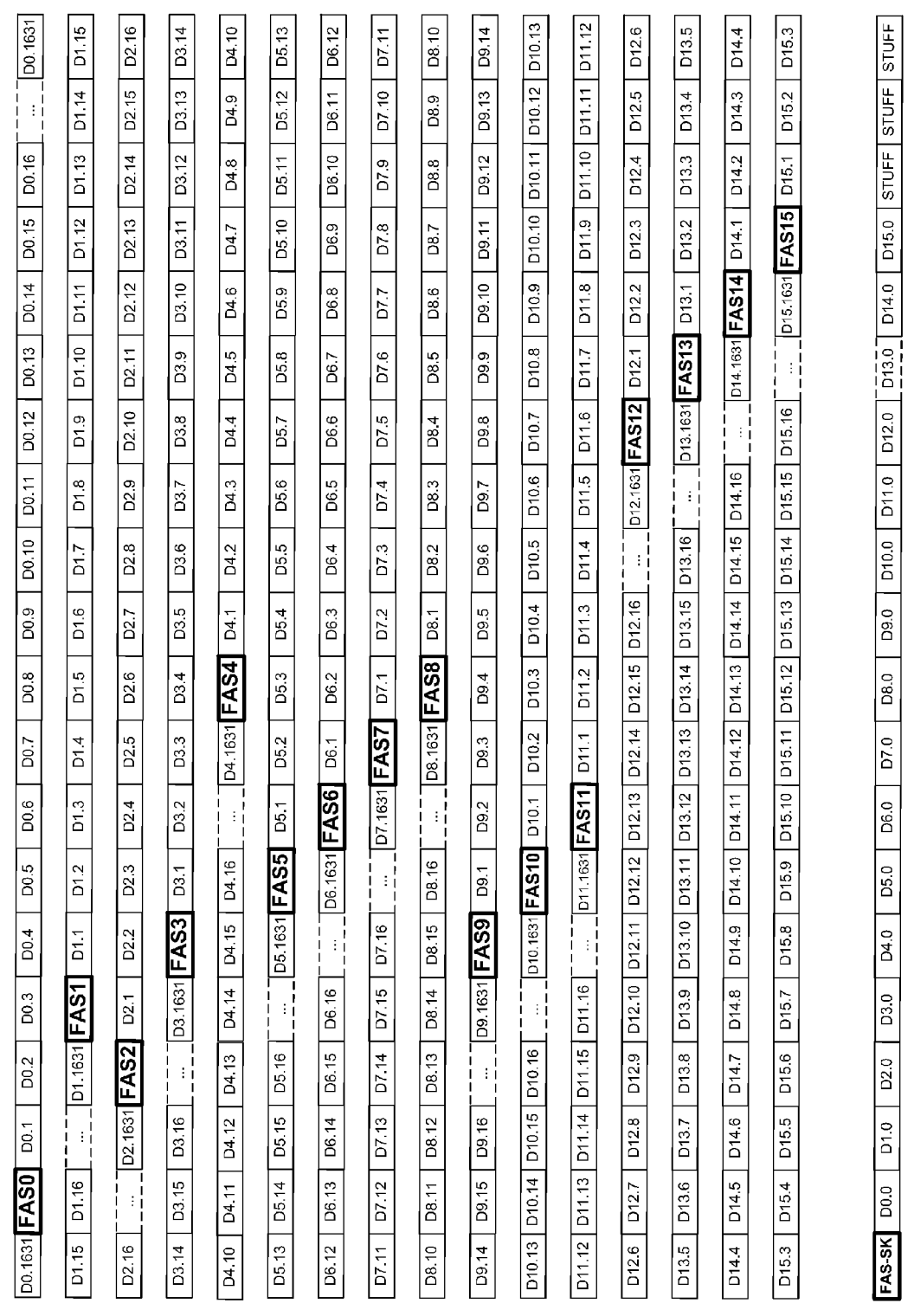

For example, FIG. 4 is a diagram illustrating offsets between data channels and a Deskew channel at a data receiver according to an embodiment of the disclosure. As shown in FIG. 4, the frame header locations of the Deskew channel and each data channel are determined at first. Frame header FAS-SK of the Deskew channel is taken as the first period, the location of frame header FAS0 of the 0th data channel is compared with the location of frame header FAS-SK of the Deskew channel to obtain a period offset 1, and the fixed offset at the data sender between the location of frame header FAS0 of the 0th data channel and the location of frame header FAS-SK of the Deskew channel is also 1, so the offset of the 0th data channel is 0, which indicates that there is no offset and no compensation is required.

The location of frame header FAS1 in the first data channel is compared with the location of frame header FAS-SK of the Deskew channel to obtain a period offset 4, but the fixed offset at the data sender between the location of frame header FAS1 in the first data channel and the location of frame header FAS-SK of the Deskew channel is 2, so the offset of the first data channel is 2, which indicates that the frame header location is delayed by 2 periods and period compensation is required to be performed on the data of the first data channel in a manner of advancing by 2 periods.

The location of frame header FAS9 in the ninth data channel is compared with the location of frame header FAS-SK of the Deskew channel to obtain a period offset 5, but the fixed offset at the data sender between the location of frame header FAS9 in the ninth data channel and the location of frame header FAS-SK of the Deskew channel is 10, so the offset of the ninth data channel is −5, which indicates that the frame header location is advanced by 5 periods and the data of the ninth data channel is required to be delayed by 5 periods and output after a delay of 5 periods.

Figure 5:
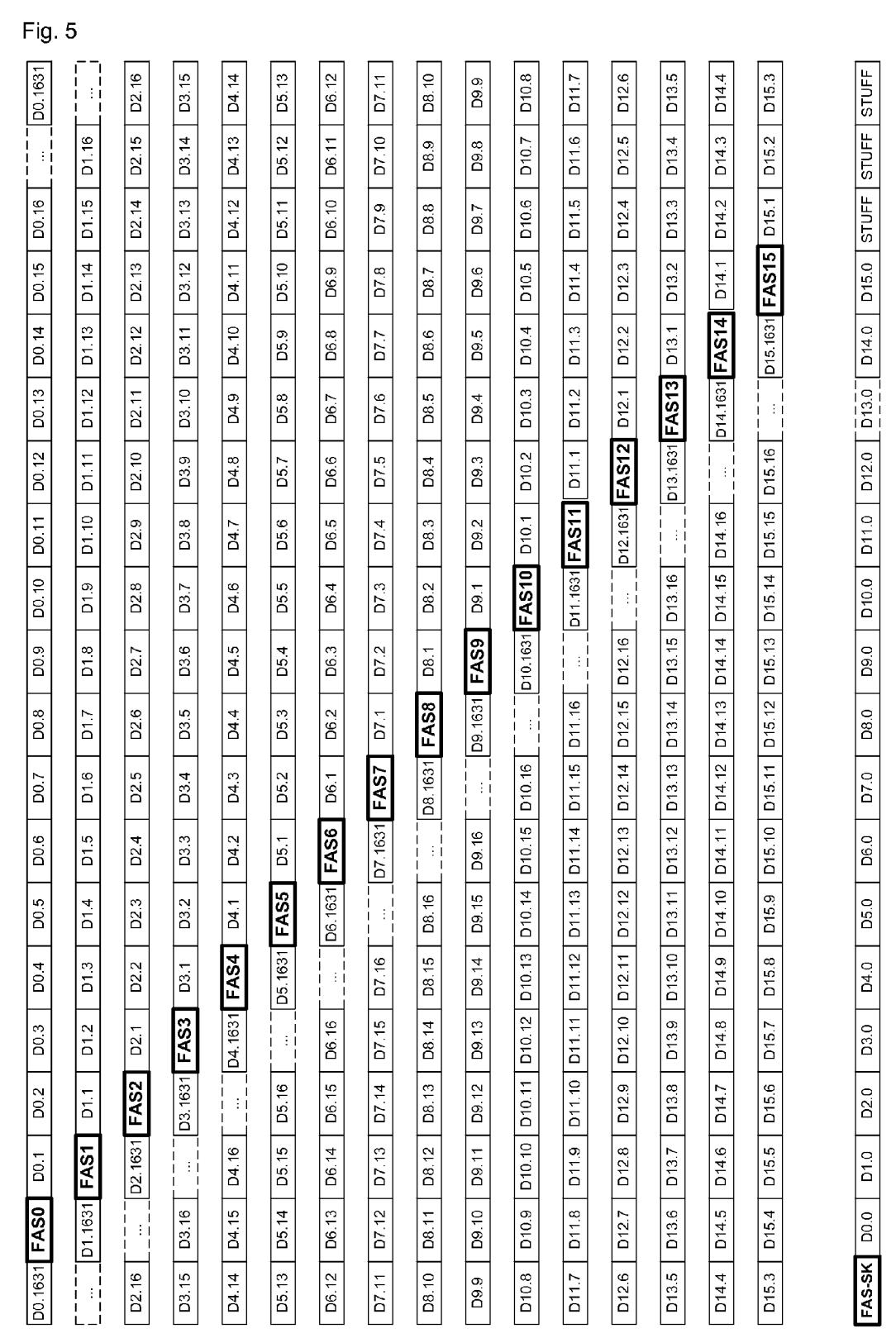

After each data channel is subjected to period compensation, corresponding relationships between the data channels and the Deskew channel are shown in FIG. 5, which is a diagram illustrating frame header alignment between data channels and a Deskew channel at a data receiver according to an embodiment of the disclosure.

In Step 103, the frame headers in the data channels are replaced with the corresponding data in the Deskew channel to finish data restoration.

Before the frame headers in the data channels are replaced with the corresponding data in the Deskew channel, the method further includes that:

values of BIP3 and BIP7 of the frame headers in each data channel are recalculated, and recalculated results are compared with current values of BIP3 and BIP7 to determine whether there is a bit error in data after transmission. If the recalculated values of BIP3 and BIP7 are the same as the current values of BIP3 and BIP7, it is indicated that there are no bit errors. If the recalculated values of BIP3 and BIP7 are different from the current values of BIP3 and BIP7, it is indicated that there are bit errors. the bit errors are subsequently counted, and an alarm is given. Methods for counting the bit errors are beyond the scope of the embodiment of the disclosure, which are not described here.

The replacement restoration of the data is realized by storing the original data that are replaced with the frame headers at the data sender at corresponding locations in the Deskew channel.

Figure 6:
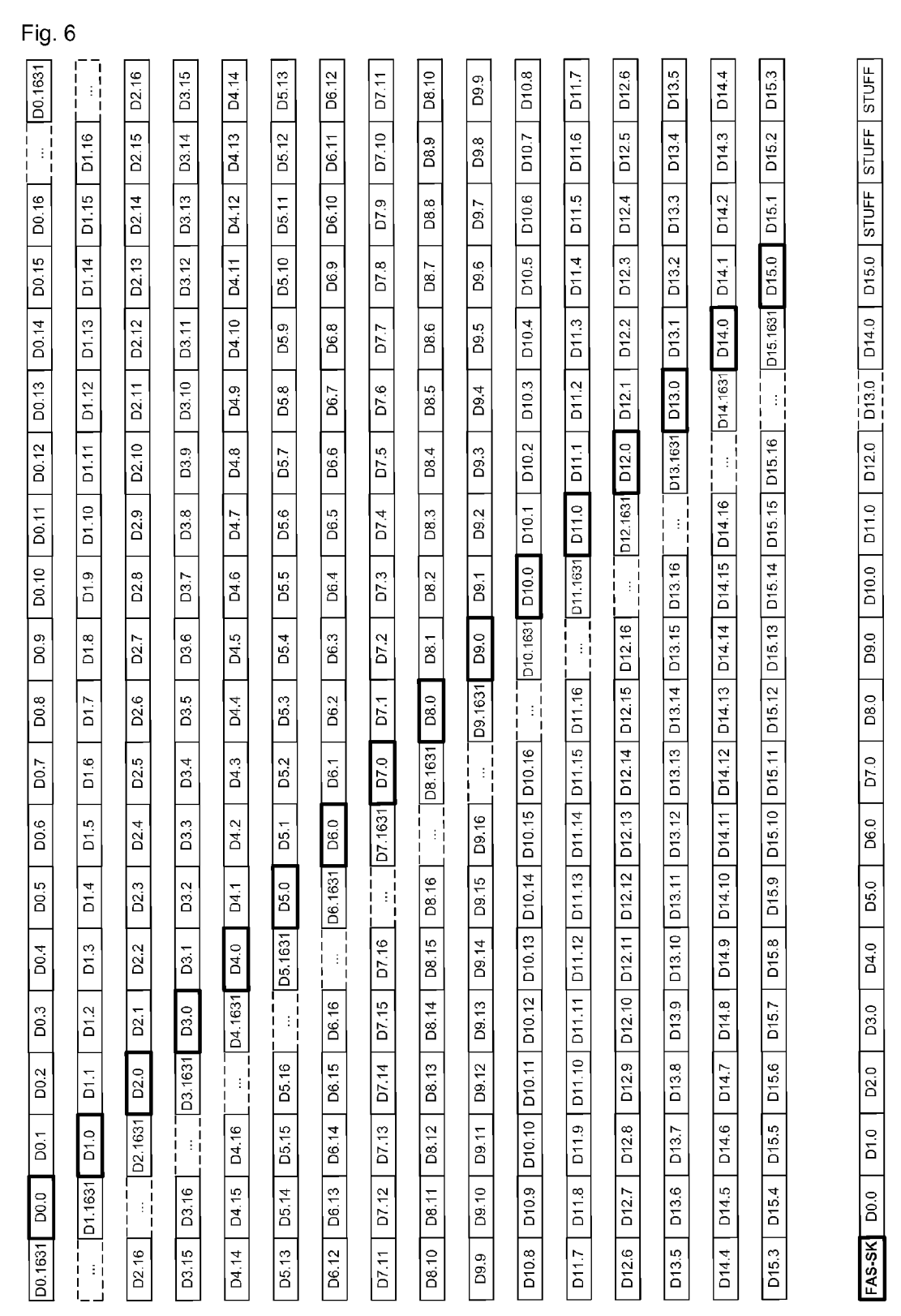

Specifically, FIG. 5 is taken as an example. If frame header FAS-SK of the Deskew channel is the first period, frame header FAS0 of the 0th data channel is the second period, and by parity of reasoning, frame header FAS15 of the 15th data channel is the 17th period. Correspondingly, data D0.0 stored in the second period of the Deskew channel is the original data replaced with frame header FAS0 in the 0th data channel, and by parity of reasoning, data D15.0 stored in the 17th period in the Deskew channel is the original data replaced with frame header FAS15 in the 15th data channel. The frame headers in the 16 data channels are replaced with the data in the Deskew channel to finish data restoration. FIG. 6 is a diagram illustrating restored data channels at a data receiver according to an embodiment of the disclosure, and the restored data channels are shown in FIG. 6.

During actual running, due to a frequency problem of data processing in the chip of the data receiver, it is still necessary to lower the clock domain and increase the data bandwidth, and then the 16 data channels with the rate of 28 Gb/s are still required to be further slowed, and each data channel is still required to be divided into two data channels according to high order and low order to map the 16 data channels into 32 data channels with the maximum rate of 14 Gb/s.

Figure 7:
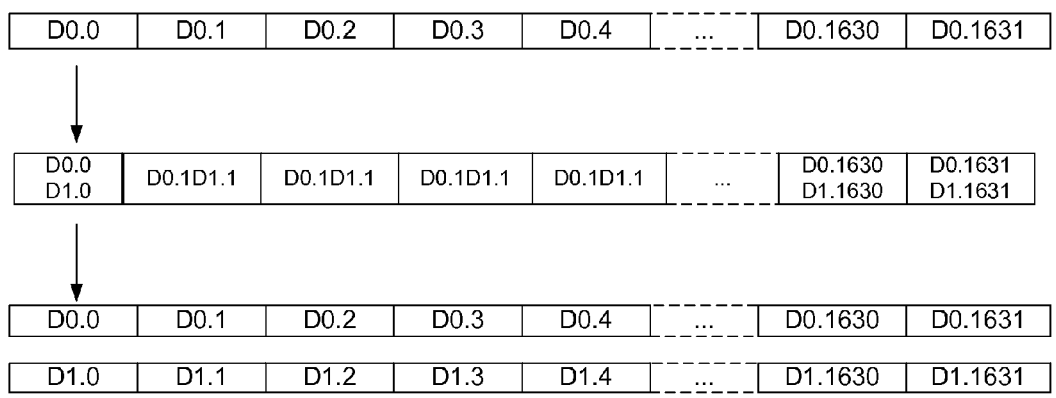
FIG. 7 is a diagram illustrating mapping one data channel into two adjacent data channels according to an embodiment of the disclosure.

FIG. 7 is a diagram illustrating mapping one data channel into two adjacent data channels according to an embodiment of the disclosure. As shown in FIG. 7, a mapping principle is reverse operation of combining every two adjacent data channels in Step 101 into one data channel. In an example, the 0th data channel is mapped into data channel 0 and data channel 1, the data of each period in the 0th data channel is 2 k bits, divided into a high-order part and a low-order part, data D0.0 can be mapped into D0.0D1.0 of which the high-order part is D0.0 and the low-order part is D1.0. D0.0 of the high-order part is placed in data channel 0, and D1.0 of the low-order part is placed in data channel 1. The other data is mapped in the same manner.

Figure 8:
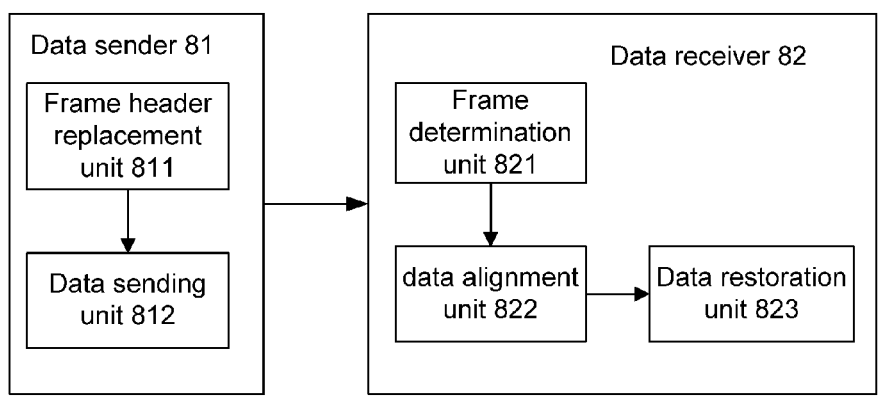
FIG. 8 is a structure diagram of a high-speed multi-channel data transmission system according to an embodiment of the disclosure.

In order to implement the abovementioned method, the embodiment of the disclosure further provides a high-speed multi-channel data transmission system. As shown in FIG. 8, the system includes a data sender 81 and a data receiver 82.

The data sender 81 is configured to replace data that are at intervals of N periods with frame headers in data channels, sequentially store the data that are replaced with the frame headers in the data channels in a Deskew channel, and send data in the data channels and data in the Deskew channel to the data receiver 82.

The data receiver 82 is configured to determine locations of frame headers of the data channels and a location of a frame header of the Deskew channel after receiving the data, to calculate offsets of the data channels according to the frame header locations, perform period compensation on the data channels according to the calculated offsets to keep the frame header of each data channel and the frame header of the Deskew channel in a relative relationship the same as that at the data sender, and to replace the frame headers in the data channels with the corresponding data in the Deskew channel to finish data restoration.

Based on the abovementioned system, the embodiment of the disclosure further provides a data sender. As shown in FIG. 8, the data sender 81 includes a frame header replacement unit 811 and a data sending unit 812.

The frame header replacement unit 811 is configured to replace data at intervals of N periods with frame headers in data channels, and sequentially store the data that are replaced with the frame headers in the data channels in a Deskew channel.

The data sending unit 812 is configured to send data in the data channels and data in the Deskew channel to a data receiver 82.

In an embodiment, the data at the intervals of N periods are replaced with the frame headers in the data channels in such manners that:

the frame headers of every two adjacent data channels have an offset of one period, and the frame headers of a next data channels are one period slower than the frame headers of a previous data channels; and the frame header of the 0th data channel is one period slower than the frame header of the Deskew channel.

In an embodiment, the frame header includes a high-order part and a low-order part. Frame headers have the same high-order part, and their low-order parts are different from each other.

In an embodiment, numerical value of BIP3 of a high-order part of a frame header is the amount of data starting from a previous frame header to a current frame header, excluding the current frame header.

The embodiment of the disclosure further provides a data receiver. As shown in FIG. 8, the data receiver 82 includes a frame determination unit 821, a data alignment unit 822 and a data restoration unit 823.

The frame determination unit 821 is configured to determine locations of frame headers in data channels and a location of a frame header in a Deskew channel after data is received.

The data alignment unit 822 is configured to calculate offsets of the data channels according to the frame header locations determined by the frame determination unit 821, and perform period compensation on the data channels according to the calculated offsets to keep the frame header of each data channel and the frame header of the Deskew channel in a relative relationship the same as that at a data sender.

The data restoration unit 823 is configured to replace the frame headers on the data channels with the corresponding data in the Deskew channel to finish data restoration.

In an embodiment, each of the frame headers includes a high-order part and a low-order part. The frame headers have the same high-order part, but their low-order parts are different from each other.

In an embodiment, the frame determination unit determines the locations of the frame headers in the data channels and the location of the frame header in the Deskew channel in such manner that: fields of each channel are searched according to high-order part sequences of the frame headers of the received data, and if fields matching with the high-order part sequences of the frame headers are found, the fields are determined as the frame headers of the channels with the fields.

In an embodiment, numerical value of BIP3 of the high-order part of the frame headers is the amount of data from a previous frame header to a current frame header, excluding the current frame header.

During practical application, the frame header replacement unit 811 of the data sender 81, and the frame determination unit 821, data alignment unit 822 and data restoration unit 823 of the data receiver 82 can be implemented by a Central Processing Units (CPU), or Digital Signal Processors (DSP) or Field-Programmable Gate Arrays (FPGA) in the devices. During practical application, the data sending unit 812 of the data sender 81 can be implemented by a sender or sending antenna in the device.

The above is only the preferred embodiment of the disclosure and not intended to limit the scope of protection of the disclosure. Any modifications, equivalent replacements, improvements and the like made within the scope of the disclosure are included in the scope of protection of the disclosure.

INDUSTRIAL APPLICABILITY

In the embodiments of the disclosure, the data is periodically replaced with the frame headers at the data sender, and the frame headers have the same high-order part, so that the frame header locations can be rapidly located at the data receiver. The problems about conventional 400 Gb/s multi-channel data alignment and restoration are solved, the frame header locations can be rapidly located at the data receiver, speed of data restoration and alignment is increased, and complexity in the data alignment and restoration at the data receiver when the data is replaced with a bit data stream in prior art is lowered. Moreover, embodiments of the disclosure are applied to unified transmission of contents in different frame formats in the same interface, so that the occurrence of the condition of adopting multiple high-speed interfaces for different services is avoided.

The invention claimed is:

1. A high-speed multi-channel data transmission method, comprising:
   replacing, by a data sender, data that are at intervals of N periods in data channels with frame headers;
   storing, sequentially in a Deskew channel, the data in the data channels that were replaced with the frame headers; and
   sending data in the data channels and data in the Deskew channel to a data receiver.

2. The method according to claim 1, wherein the data sender replacing the data that are at intervals of N periods in the data channels with the frame headers comprises:
   frame headers of every two adjacent data channels have an offset of one period, wherein a frame header of a next data channels is one period slower than a frame header of a previous data channels; and
   making a frame header of the 0th data channel be one period slower than a frame header of the Deskew channel.

3. The method according to claim 1, comprising: making high-order parts of the frame headers be identical and low-order parts of the frame headers be different from each other.

4. The method according to claim 3, comprising:
   making a numerical value of Bit Interleaved Parity 3 (BIP3) of the high-order part of each frame header be an amount of data starting from a previous frame header to a current frame header, excluding the current frame header.

5. A high-speed multi-channel data receiving method, comprising:
   determining, by a data receiver, locations of frame headers in data channels and a location of a frame header in a Deskew channel after receiving data from a data sender;
   calculating offsets of the data channels according to locations of frame headers;
   performing period compensation on the data channels according to the calculated offsets, so as to keep a frame header of each data channel and the frame header of the Deskew channel in a relative relationship the same as that at the data sender; and
   replacing the frame headers in the data channels with the corresponding data in the Deskew channel to finish data restoration.

6. The method according to claim 5, further comprising:
   receiving data in the data channels and data in the Deskew channel from the data sender;
   wherein replacing the frame headers in the data channels with the corresponding data in the Deskew channel to finish data restoration comprises:
   replacing the data at intervals of N periods with the frame headers on the data channels, and sequentially storing the data replaced with the frame headers in the Deskew channel.

7. The method according to claim 6, wherein replacing the data at the intervals of N periods with the frame headers comprises:
   making the frame headers of every two adjacent data channels have an offset of one period, and a frame header of a next data channel be one period slower than a frame header of a previous data channel; and
   making a frame header of the 0th data channel be one period slower than the frame header of the Deskew channel.

8. The method according to claim 7, comprising: making high-order parts of the frame headers be identical and low-order parts of the frame headers be different from each other.

9. The method according to claim 8, wherein the step of determining the frame header locations in the data channels and the Deskew channel is implemented by:
   searching for fields of each channel according to high-order part sequences of the frame headers, and if fields matching with the high-order part sequences of the frame headers are found, determining the fields as the frame headers of the channels with the fields.

10. The method according to claim 9, comprising:
    making a numerical value of Bit Interleaved Parity 3 (BIP3) of the high-order part of each frame headers be an amount of data starting from a previous frame header to a current frame header, excluding the current frame header.

11. A high-speed multi-channel data sender, comprising:
    a processor; and
    a memory storing program instructions, which, when executed by the processor, cause the processor to perform steps comprising:
    replacing data that are at intervals of N periods in data channels with frame headers, and sequentially storing in a Deskew channel the data replaced with the frame headers in the data channels; and
    sending data in the data channels and data in the Deskew channel to a data receiver.

12. The data sender according to claim 11, wherein replacing the data that are at the intervals of N periods with the frame headers on the data channels comprises:
    causing the frame headers of every two adjacent data channels to have an offset of one period, and a frame header of a next data channel is one period slower than a frame header of a previous data channel; and
    a frame header of the 0th data channel to be one period slower than a frame header of the Deskew channel.

13. The data sender according to claim 11, comprising: making high-order parts of the frame headers be identical and low-order parts of the frame headers be different from each other.

14. The data sender according to claim 13, comprising: making a numerical value of Bit Interleaved Parity 3 (BIP3) of the high-order part of each frame header be an amount of data starting from a previous frame header to a current frame header, excluding the current frame header.

15. A high-speed multi-channel data receiver, comprising:
a processor; and
a memory storing program instructions, which, when executed by the processor, cause the processor to perform steps comprising:
determining locations of frame headers in data channels and a location of a frame header in a Deskew channel after data are received;
calculating offsets of the data channels according to the determined locations of frame headers, and performing period compensation on the data channels according to the calculated offsets, so as to keep a frame header of each data channel and the frame header of the Deskew channel in a relative relationship the same as that at a data sender; and
replacing the frame headers in the data channels with the corresponding data in the Deskew channel to finish data restoration.

16. The data receiver according to claim 15, comprising: making high-order parts of the frame headers be identical and low-order parts of the frame headers be different from each other.

17. The data receiver according to claim 16, wherein determining the frame header locations in the data channels and the Deskew channel is performed by the processor in such a manner that: searching for fields of each channel according to high-order part sequences of the frame headers of the received data, and if fields matching with the high-order part sequences of the frame headers are found, the fields are determined as the frame headers of the channels with the fields.

18. The data receiver according to claim 17, comprising: making a numerical value of Bit Interleaved Parity 3 (BIP3) of the high-order part of each frame header be an amount of data starting from a previous frame header to a current frame header, excluding the current frame header.

19. A high-speed multi-channel data transmission system, comprising a high-speed multi-channel data sender and a high-speed multi-channel data receiver;
the high-speed multi-channel data sender comprises: a processor and a memory storing program instructions, which, when executed by the processor, cause the processor to perform steps comprising:
replacing data that are at intervals of N periods in data channels with frame headers, and sequentially store in a Deskew channel the data replaced with the frame headers in the data channels; and
sending data in the data channels and data in the Deskew channel to a data receiver; and
the high-speed multi-channel data receiver comprises: a processor and a memory storing program instructions, which, when executed by the processor, cause the processor to perform steps comprising:
determining locations of frame headers in data channels and a location of a frame header in a Deskew channel after data are received;
calculating offsets of the data channels according to the determined locations of frame headers, and performing period compensation on the data channels according to the calculated offsets, so as to keep a frame header of each data channel and the frame header of the Deskew channel in a relative relationship the same as that at a data sender; and
replacing the frame headers in the data channels with the corresponding data in the Deskew channel to finish data restoration.

20. The system according to claim 19, wherein replacing the data that at the intervals of N periods with the frame headers on the data channels comprises:
causing the frame headers of every two adjacent data channels to have an offset of one period, and a frame header of a next data channel to be one period slower than a frame header of a previous data channel; and
a frame header of the 0th data channel is one period slower than a frame header of the Deskew channel.

21. The system according to claim 19, making high-order parts of the frame headers be identical and low-order parts of the frame headers be different from each other.

22. The system according to claim 21, comprising: making a numerical value of Bit Interleaved Parity 3 (BIP3) of the high-order part of each frame header be an amount of data starting from a previous frame header to a current frame header, excluding the current frame header.

23. The system according to claim 21, wherein determining the frame header locations in the data channels and the Deskew channel comprises: searching for fields of each channel according to high-order part sequences of the frame headers of the received data, and if fields matching with the high-order part sequences of the frame headers are found, determining the fields as the frame headers of the channels with the fields.

* * * * *